No. 833,378. PATENTED OCT. 16, 1906.
W. FLYNN.
VEHICLE WHEEL RIM.
APPLICATION FILED DEC. 4, 1905.
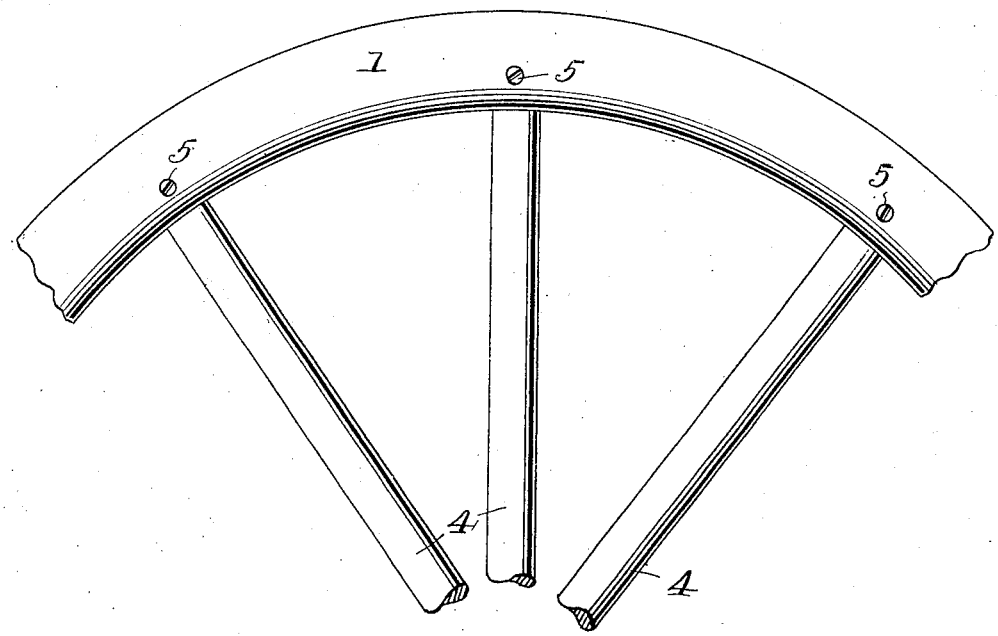
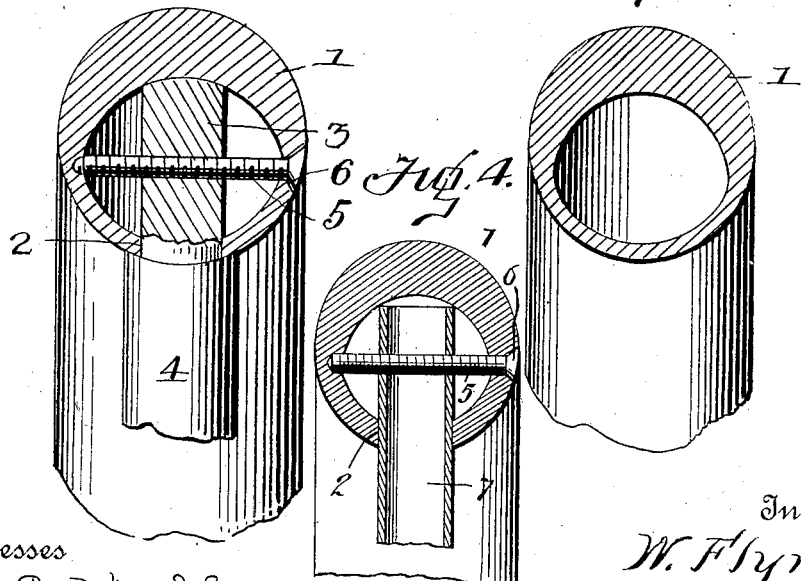
Witnesses
Jas. A. Koehl
C. H. Girsbauer
Inventor
W. Flynn.
by H. B. Wilson
Attorney

UNITED STATES PATENT OFFICE.

WILLIAM FLYNN, OF NASHVILLE, TENNESSEE.

VEHICLE-WHEEL RIM.

No. 833,378.

Specification of Letters Patent.

Patented Oct. 16, 1906.

Application filed December 4, 1905. Serial No. 290,273.

*To all whom it may concern:*

Be it known that I, WILLIAM FLYNN, a citizen of the United States, residing at Nashville, in the county of Davidson and State of Tennessee, have invented certain new and useful Improvements in Vehicle-Wheel Rims and Spokes; and I do declare the following to be a full, clear, and exact description of the invention, such as will enable others skilled in the art to which it appertains to make and use the same.

This invention relates to improvements in vehicle-wheel rims.

The object of the invention is to provide a rim for vehicle-wheels by the use of which a tire is dispensed with, the invention forming both the rim and the tire.

A further object is to provide a vehicle-wheel rim which will be strong, durable, and inexpensive in construction, means being provided whereby the outer ends of the spokes may be firmly secured to the rim.

With the above and other objects in view the invention consists of certain novel features of construction, combination, and arrangement of parts, as will be hereinafter described and claimed.

In the accompanying drawings, Figure 1 is a side view of a portion of a wheel-rim and spokes constructed in accordance with the invention. Fig. 2 is a cross-sectional view through the rim taken on a line with one of the spokes. Fig. 3 is a similar view taken on a line between two of the spokes; and Fig. 4 is a detail cross-sectional view similar to Fig. 2, showing a modified construction of the spokes.

Referring more particularly to the drawings, 1 denotes the rim, which is constructed of an inflexible tubing, preferably formed of metal, the ends of which are suitably joined to form an endless ring. The material forming the tubular rim is reinforced on its outer or tread side, preferably by thickening the same at this point. By thus reinforcing or thickening the outer surface of the rim the same is rendered less liable to puncture or indentation in passing over rough or irregular surfaces.

On the inner side of the rim is formed a series of radially-disposed apertures 2, adapted to receive the tenons 3 on the outer ends of the spokes 4. In order that the ends of the spokes and rim may be held in firm engagement, suitable fastening means are provided, said means being here shown and are preferably in the form of screws 5, which are driven through apertures 6, formed in the side of the wheel-rim, and into the tenons of the spokes, as shown.

A wheel-rim constructed as herein shown and described will be light in weight and, owing to the tubular formation of the same, will be possessed of great strength and durability. The rims may be applied to any form of vehicle-wheels, and while the same are herein shown and described as being secured to the ends of the spokes by means of screws driven into the inserted ends of the spoke-tenons it is obvious that various other means of securing the rim and spokes together may be employed within the scope of the invention.

In Fig. 4 of the drawings is shown a modified form of spoke. In this instance instead of a solid wooden spoke I provide a tubular metallic spoke 7, which is adapted to be inserted into the tubular rim and to be secured therein by means of the screw 5, as hereinbefore described.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention as defined by the appended claim.

Having thus described my invention, what I claim as new, and desire to secure by Letters Patent, is—

The herein-described vehicle-wheel having a cylindrical tubular metal rim made thicker on its tread-surface and provided with a series of radially-disposed apertures on its inner surface, metal spokes extending through said apertures and bearing against the inner wall of the rim, and countersunk screws for holding the spokes in place, substantially as described.

In testimony whereof I have hereunto set my hand in presence of two subscribing witnesses.

WILLIAM FLYNN.

Witnesses:
S. G. BARNETT,
JAMES FREEMAN.